J. R. MICKEY.
Churn.
No. 58,192.
Patented Sept. 18, 1866.
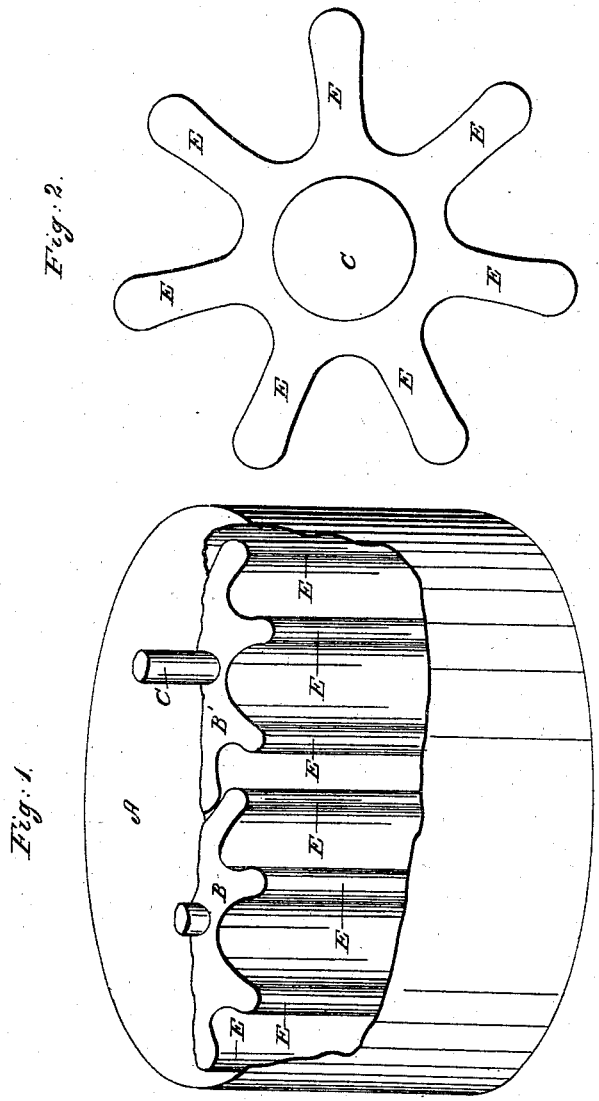

UNITED STATES PATENT OFFICE.

JOHN R. MICKEY, OF CHICAGO, ILLINOIS.

IMPROVEMENT IN CHURNS.

Specification forming part of Letters Patent No. 58,192, dated September 18, 1866.

*To all whom it may concern:*

Be it known that I, JOHN R. MICKEY, of Chicago, in the county of Cook and State of Illinois, have invented a new and useful Improvement in Churns; and I do hereby declare that the following is a full, clear, and exact description of the construction and operation of the same, reference being had to the annexed drawings, and letters of reference marked thereon, making a part of this specification, in which—

Figure 1 is a perspective representation of my churn. Fig. 2 is a plan view of one of the cog-dashers.

The object of my invention is to provide a convenient churn of compact form, which is to be used more especially in the manufacture of butter from milk; and its nature consists in the use of two or more upright cog-dashers, operating together in the barrel of the churn in such a manner as to produce friction-pressure upon the milk when passing between the dashers, and also properly agitate the milk in all parts of the churn. By this arrangement the milk will pass in a continuous current between the dashers, by which means butter is separated from the milk in much less time than by means of any churn now in use of as simple construction.

To enable others skilled in the art to make and use my invention, I will describe the method of construction and operation.

A represents the common churn-barrel, which may be made of any size and form desired; but it should conform to the size of the dashers used.

B' B show the cog-dashers, having at the top and bottom suitable bearings, so arranged that the dashers will revolve when power is applied to the shaft C.

E shows the wings or cogs, which mesh together, the dasher B' drawing the dasher B.

The cogs E may be made of any length; but the proportion shown at Fig. 2 will be found practical in most cases and answer the desired purpose.

The dashers B should be made of firm hard wood, and set at such a distance apart as will allow them to be easily turned.

Operation: The cream or milk can be put in the churn in the usual manner, after which power must be applied to the shaft C in order to give the requisite motion to the dashers B.

Care must be taken when gathering or working butter not to operate the dashers too fast, especially when working in salt.

Having thus fully described my invention, what I claim, and desire to secure by Letters Patent of the United States, is—

The combination of the cog-dashers B B' when constructed substantially as and for the purpose set forth.

JOHN R. MICKEY.

Witnesses:
FRANK CUNNINGHAM,
J. L. MERIAM.